US011167695B2

(12) United States Patent
Lee et al.

(10) Patent No.: US 11,167,695 B2
(45) Date of Patent: Nov. 9, 2021

(54) LUGGAGE BOX APPARATUS FOR VEHICLE

(71) Applicants: Hyundai Motor Company, Seoul (KR); Kia Motors Corporation, Seoul (KR); DAEJOO PRECISION INDUSTRIAL, Hwaseong-si (KR)

(72) Inventors: Dae Min Lee, Incheon (KR); Min Ho Cho, Suwon-si (KR); Seung Soo Ryu, Gunpo-si (KR); Kwang Ok Jeon, Suwon-si (KR); Sung Hoon Choo, Ulsan (KR); Sang Bok Lee, Hwaseong-si (KR); Ho Duck Lee, Ansan-si (KR)

(73) Assignees: Hyundai Motor Company, Seoul (KR); Kia Motors Corporation, Seoul (KR); Daejoo Precision Industrial, Hwaseong-si (KR)

( * ) Notice: Subject to any disclaimer, the term of this patent is extended or adjusted under 35 U.S.C. 154(b) by 100 days.

(21) Appl. No.: 16/594,513

(22) Filed: Oct. 7, 2019

(65) Prior Publication Data
US 2020/0324705 A1    Oct. 15, 2020

(30) Foreign Application Priority Data
Apr. 15, 2019  (KR) .................. 10-2019-0043465

(51) Int. Cl.
*B60R 5/04*     (2006.01)

(52) U.S. Cl.
CPC .................... *B60R 5/044* (2013.01)

(58) Field of Classification Search
CPC ..... B60R 5/04; B60R 7/04; B60R 2011/0036; B60R 2011/0019; B60R 13/013; A47B 46/00; A47B 88/48; A47B 88/80
USPC .... 296/37.8, 37.13; 312/322, 295, 309, 310, 312/311
See application file for complete search history.

(56) References Cited

U.S. PATENT DOCUMENTS

| | | | | |
|---|---|---|---|---|
| 1,406,129 | A * | 2/1922 | Woltz ..................... | A47B 88/48 312/322 |
| 2,650,871 | A * | 9/1953 | Holderegger .......... | A47B 88/48 312/322 |
| 2,788,253 | A * | 4/1957 | Gussack ................ | A47B 88/48 312/323 |
| 3,519,319 | A * | 7/1970 | Taylor .................... | A47B 88/48 312/246 |
| 6,263,867 | B1 * | 7/2001 | Skelton ..................... | B60R 9/02 126/25 R |

(Continued)

FOREIGN PATENT DOCUMENTS

| | | | | |
|---|---|---|---|---|
| CN | 108407581 | A * | 8/2018 | ............. E05B 83/28 |
| EP | 3034355 | A1 * | 6/2016 | ............... B60R 7/02 |

(Continued)

*Primary Examiner* — Jason S Morrow
*Assistant Examiner* — Kevin P Weldon
(74) *Attorney, Agent, or Firm* — Slater Matsil, LLP

(57) ABSTRACT

A luggage box apparatus for a vehicle is disclosed. The luggage box apparatus includes a main box received in a main box receiving space provided at a luggage side trim. The main box is withdrawable from the main box receiving space toward a luggage compartment, for use thereof. The main box is installed to perform linear sliding movement in a withdrawal direction and rotation with respect to the luggage side trim.

20 Claims, 13 Drawing Sheets

(56) References Cited

U.S. PATENT DOCUMENTS

| | | | | |
|---|---|---|---|---|
| 9,016,748 B1* | 4/2015 | Ardigo | ................... | B60R 7/046 |
| | | | | 296/37.13 |
| 2017/0253196 A1* | 9/2017 | Barrow | ..................... | B60R 7/02 |
| 2019/0232851 A1* | 8/2019 | Frederick | .................. | B60R 5/04 |
| 2020/0130587 A1* | 4/2020 | Cho | .......................... | B60R 7/02 |
| 2020/0324706 A1* | 10/2020 | Cho | .......................... | B60R 7/04 |

FOREIGN PATENT DOCUMENTS

| | | | | |
|---|---|---|---|---|
| EP | 3147160 A2 * | 3/2017 | ............... | B60R 9/02 |
| FR | 2900700 A1 * | 11/2007 | ................ | F16C 1/10 |
| FR | 2979303 A1 * | 3/2013 | ................ | B60R 7/04 |
| JP | 2005247238 A * | 9/2005 | | |
| KR | 20030008913 A | 1/2003 | | |
| KR | 200331590 Y1 * | 11/2003 | | |

\* cited by examiner

LUGGAGE BOX APPARATUS FOR VEHICLE

CROSS-REFERENCE TO RELATED APPLICATIONS

This application claims priority to Korean Patent Application No. 10-2019-0043465, filed in the Korean Intellectual Property Office on Apr. 15, 2019, which application is hereby incorporated herein by reference.

TECHNICAL FIELD

The present invention relates to a luggage box apparatus for a vehicle.

BACKGROUND

Vehicles for leisure such as a recreational vehicle (RV), a sport utility vehicle (SUV) and a multi-purpose vehicle (MPV) are provided with a luggage compartment behind rear seats in order to store luggage. At each of luggage side trims defining the luggage compartment, a luggage box, which includes a tray having a simple open structure opened toward the luggage compartment, is provided.

Articles stored in the tray are prevented from being separated by a net covering a front surface of the tray. Such a tray, which has a simple open structure as mentioned above, may have a drawback in that it is difficult to store a large number of articles. In particular, there may be a drawback in that an unused space (that is, a space present when appliances of optional specification such as a rear seat air conditioner and a woofer speaker are not applied) present at a side portion of the luggage compartment may be insufficiently used. Furthermore, there may also be a drawback in that a separate net should be used in order to prevent separation of articles stored in the tray.

The above matters disclosed in this section are merely for enhancement of understanding of the general background of the invention and should not be taken as an acknowledgement or any form of suggestion that the matters form the related art already known to a person skilled in the art.

SUMMARY

The present disclosure relates to a luggage box apparatus for a vehicle. In particular embodiments of the present disclosure relate to a luggage box apparatus for a vehicle having an improved configuration capable of achieving an enhancement in storage functionality by utilizing an unused space present at side portions of a luggage compartment.

Embodiments have been made in view of the problems associated with the prior art.

Embodiments can provide a luggage box apparatus for a vehicle having a configuration including a main box usable through withdrawal thereof from a main box receiving space provided at a luggage side trim toward a luggage compartment, and a hidden box usable through withdrawal thereof from a side wall of the main box receiving space toward the main box receiving space after withdrawal of the main box, thereby being capable of not only achieving an enhancement in space utility and an enhancement in storage functionality through maximal use of an unused space present at a side portion of the luggage compartment, but also achieving cost saving by virtue of no use of a net for prevention of separation of articles.

In accordance with an aspect of the present invention, a luggage box apparatus for a vehicle includes a main box received in a main box receiving space provided at a luggage side trim. The main box is withdrawable from the main box receiving space toward a luggage compartment, for use thereof. The main box is installed to perform linear sliding movement in a withdrawal direction and rotation with respect to the luggage side trim.

The luggage box apparatus may further include a hidden box installed at a side wall defining the main box receiving space, the hidden box being withdrawable from the side wall toward the main box receiving space after withdrawal of the main box, for use thereof.

The luggage box apparatus may further include a rail mechanism installed to connect the main box and the luggage side trim, the rail mechanism guiding the linear sliding movement of the main box, and a rotating mechanism installed to connect the rail mechanism and the main box, the rotating mechanism enabling the rotation of the main box.

The luggage box apparatus may further include a locking mechanism operating to lock or unlock the rail mechanism and the rotating mechanism. When the locking mechanism operates under a condition that both the rail mechanism and the rotating mechanism are in a locked state, unlocking of the rail mechanism and unlocking of the rotating mechanism may be sequentially carried out in this order.

The rail mechanism may include a fixed rail fixedly coupled to the luggage side trim, a movable rail coupled to the fixed rail such that the movable rail is movable along the fixed rail, and a rail bracket coupled to the movable rail and the main box, to connect the movable rail and the main box. A first locking hole and a second locking hole may be formed at opposite ends of the fixed rail, respectively, to be open in a downward direction. A third locking hole may be formed at the movable rail, to be open in a downward direction.

The rotating mechanism may include a hinge shaft rotatably coupled to one end of the rail bracket facing the luggage compartment, and a hinge bracket for connecting the hinge shaft and the main box.

The locking mechanism may include a handle lever elastically rotatably mounted to the main box by means of a first shaft and a first spring, a release lever elastically movably mounted to the main box by means of a second spring while being spaced apart from the handle lever such that the release lever comes into contact with the handle lever during rotation of the handle lever, thereby enabling the release lever to operate, a locking pin elastically movably mounted to the rail bracket by means of a third spring while having one end extendable through the movable rail, to operate such that the end is inserted into or separated from the first locking hole of the fixed rail or the second locking hole of the fixed rail, a locking hook elastically rotatably mounted to the main box by means of a second shaft and a fourth spring such that the locking hook operates to be inserted into or separated from a third locking hole of the movable rail, a first wire for connecting the handle lever and the locking pin, and a second wire for connecting the release lever and the locking hook.

When the handle lever rotates up to a position where the handle lever comes into contact with the release lever, in a state in which the handle lever is spaced apart from the release lever without contacting the release lever, only the first wire may be pulled toward the handle lever, thereby causing the locking pin to operate first. When the release lever comes into contact with the handle lever in accordance with continued rotation of the handle lever, thereby causing the release lever to move, the second wire may be pulled toward the release lever, thereby causing the locking hook to operate.

Plural arc-shaped grooves may be formed at one end of the rail bracket while being spaced apart from one another in a rotation direction about the hinge shaft. The hinge bracket may be provided with a ball selectively insertable into one of the arc-shaped grooves and a ball spring for elastically supporting the ball.

The luggage box apparatus for vehicles according to the present invention has a configuration capable of receiving and storing articles using the main box and the hidden box and, as such, it may be possible to increase the number of articles to be stored. Accordingly, there may be an effect of achieving an enhancement in storage functionality.

In addition, since the main box and the hidden box may be received and stored in the interior of the luggage side trim through utilization of the unused space, the present invention may have an effect of a great enhancement in space utility.

Furthermore, the present invention may provide a configuration capable of preventing separation of articles stored in the main box and the hidden box without using a net, differently from conventional cases. Accordingly, there may be an effect in that cost saving is achieved by virtue of no use of a net.

In addition, in accordance with the present invention, when the main box and the hidden box are in a state of being received in the luggage side trim, only an outline of the main box is visible from the outside of the luggage side trim. Accordingly, there may be an effect in that exposure of the main box and the hidden box in the received state is minimized and, as such, an enhancement in aesthetics may be achieved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Figure 1:
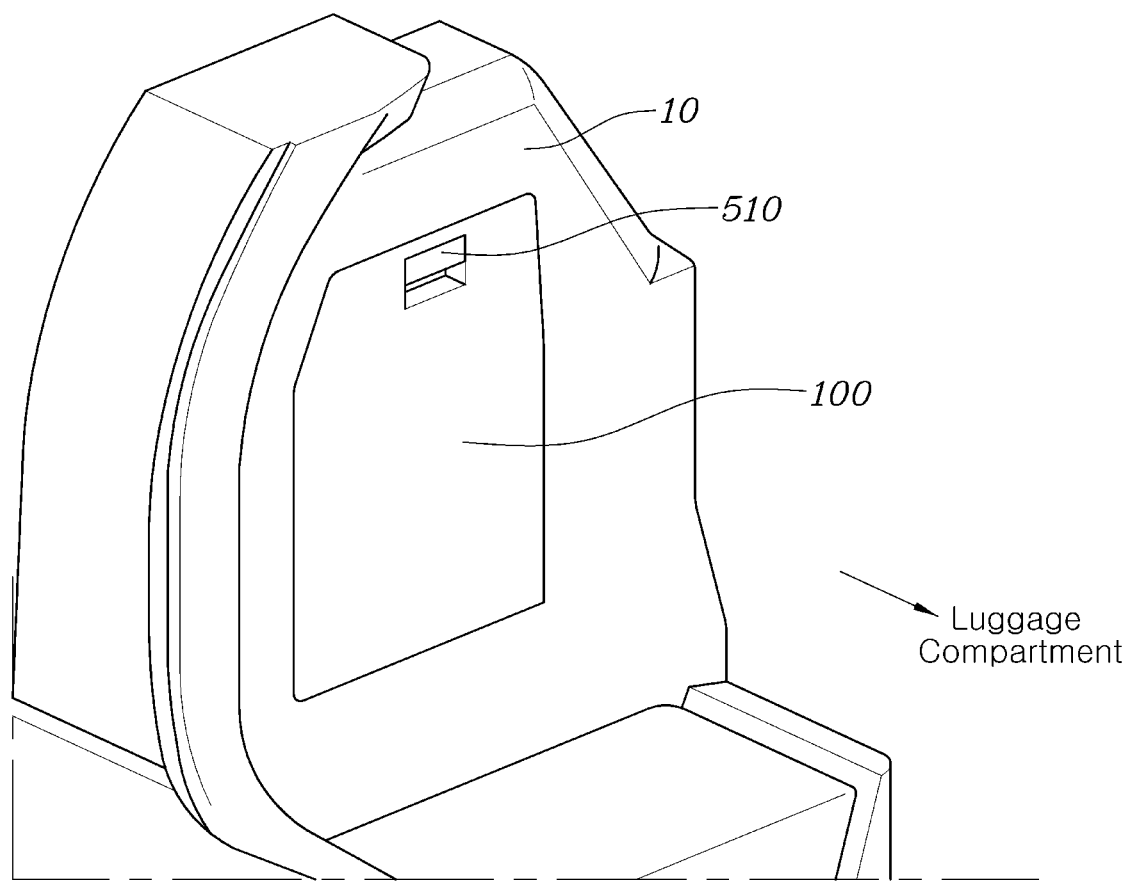
FIG. 1 is a view illustrating a state in which a main box included in a luggage box apparatus according to the present invention is received in a luggage side trim.

Reference will now be made in detail to the preferred embodiments of the present invention, examples of which are illustrated in the accompanying drawings. Wherever possible, the same reference numbers will be used throughout the drawings to refer to the same or like parts.

Hereinafter, a luggage box apparatus for a vehicle according to a preferred embodiment of the present invention will be described with reference to FIGS. 1 to 12.

As illustrated in the drawings, the luggage box apparatus according to the illustrated embodiment of the present invention includes a main box 100 and a hidden box 200.

The main box 100 is installed in such a manner that the main box 100 is received in a main box receiving space 11 provided at a luggage side trim 10. The main box 100 is configured to be withdrawable from a state of being received in the main box receiving space 11 in accordance with operation of the user such that the main box 100 is exposed to the luggage compartment 20, for use thereof.

That is, the main box 100 has a configuration enabling the main box 100 to be withdrawn from a retracted state, in which the main box 100 is received in the main box receiving space 11, in accordance with linear sliding movement thereof in a withdrawal direction and rotation thereof with respect to the luggage side trim 10 such that the main box 100 is exposed to the luggage compartment 20.

The hidden box 200 is installed to be hidden by a side wall defining the main box receiving space 11. When the main box 100 is withdrawn from the main box receiving space 11 to the luggage compartment 20, the main box receiving space 11 becomes empty. In this state, the user may use the hidden box 200 hidden by the side wall of the main box receiving space 11 after withdrawing the hidden box 200 toward the main box receiving space 11.

The main box receiving space 11 to receive the main box 100 and a space to receive the hidden box 200, which are defined in the luggage side trim 10, are secured through utilization of an unused space (that is, a space present when appliances of optional specification such as a rear seat air conditioner and a woofer speaker are not applied) present at a side portion of the luggage compartment 20. As the main box 100 and the hidden box 200 may be received and stored in the interior of the luggage side trim 10 through utilization of the unused space, there may be an advantage in that space utility is greatly enhanced.

In addition, the present invention provides a configuration capable of receiving and storing articles using the main box 100 and the hidden box 200 and, as such, it may be possible to increase the number of articles to be stored. Accordingly, there may be an advantage in that an enhancement in storage functionality is achieved.

Furthermore, the present invention provides a configuration capable of preventing separation of articles stored in the main box 100 and the hidden box 200 without using a net, differently from conventional cases. Accordingly, there may be an advantage in that cost saving is achieved by virtue of no use of a net.

In addition, in accordance with the present invention, when the main box 100 and the hidden box 200 are in a state of being received in the luggage side trim 10, only an outline of the main box 100 is viewed at the outside of the luggage side trim 10. Accordingly, there may be an advantage in that exposure of the main box 100 and the hidden box 200 in the received state is minimized and, as such, an enhancement in aesthetics may be achieved.

The luggage box apparatus according to the illustrated embodiment of the present invention includes a rail mechanism 300 installed to connect the main box 100 and the luggage side trim 109 while guiding linear sliding movement of the main box 100, and a rotating mechanism 400 installed to connect the rail mechanism 300 and the main box 100 while enabling rotation of the main box 100. The luggage box apparatus further includes a locking mechanism 500 operating to lock or unlock the rail mechanism 300 and the rotating mechanism 400.

The rail mechanism 300 includes a fixed rail 310 fixedly coupled to the luggage side trim 10, a movable rail 320 coupled to the fixed rail 310 such that the movable rail 320 is movable along the fixed rail 310, and a rail bracket 330 coupled to the movable rail 320 and the main box 100, to connect the movable rail 320 and the main box 100.

The fixed rail 310 is installed to extend laterally in the main box receiving space 11. The movable rail 320, which is coupled to the fixed rail 310, and the rail bracket 330 are configured to move laterally along the fixed rail 310.

In addition, two rail mechanisms 300 may be provided at upper and lower portions of the main box 100, respectively. In this case, the two rail mechanisms 300 are connected to configure a double rail mechanism and, as such, more stable sliding movement may be achieved.

The fixed rail 310 is provided, at opposite lateral ends thereof, with a first locking hole 311 and a second locking hole 312 formed to be open toward the movable rail 320, respectively. The movable rail 320 is provided with a third locking hole 321 formed to be open toward the rail bracket 330.

The rotating mechanism 400 includes a hinge shaft 410 rotatably coupled to one end of the rail bracket 330 facing the luggage compartment 20, and a hinge bracket 420 for connecting the hinge shaft 410 and the main box 100.

When the user withdraws the main box 100 received in the main box receiving space 11 toward the luggage compartment 20, the movable rail 320 and the rail bracket 330 are moved toward the luggage compartment 20 along the fixed rail 310. Accordingly, the main box 100 coupled to the rail bracket 330 is also moved toward the luggage compartment 20 and, as such, is positioned in a pop-up state, in which the main box 100 is exposed to the luggage compartment 20.

When the user applies force to the main box 100 positioned in the pop-up state to be exposed to the luggage compartment 20, thereby rotating the main box 100, the hinge bracket 420 connected to the main box 100 is rotated about the hinge shaft 410 and, as such, the main box 100 is rotated toward the luggage compartment 20. Thus, withdrawal of the main box 100 is completed.

When withdrawal of the main box 100 from the main box receiving space 11 to the luggage compartment 20 is completed through the above-described linear sliding movement and rotation, the main box receiving space 11 becomes empty. In this state, the user may withdraw the hidden box 200 hidden by the side wall of the main box receiving space 11 toward the main box receiving space 11, in order to use the hidden box 200.

The locking mechanism 500 includes a handle lever 510 elastically rotatably mounted to the main box 100 by means of a first shaft 511 and a first spring 512, and a release lever 520 elastically movably mounted to the main box 100 by means of a second spring 521 while being spaced apart from the handle lever 510 such that the release lever 520 comes into contact with the handle lever 510 during rotation of the handle lever 510 and, as such, operates. The locking mechanism 500 further includes a locking pin 530 elastically movably mounted to the rail bracket 330 by means of a third spring 531 while having one end extendable through the movable rail 320, to operate such that the end is inserted into or separated from the first locking hole 311 or the second locking hole 312 of the fixed rail 310, a locking hook 540 elastically rotatably mounted to the main box 100 by means of a second shaft 541 and a fourth spring 542 such that the locking hook 540 operates to be inserted into or separated from a third locking hole 321 of the movable rail 320, a first wire 550 for connecting the handle lever 510 and the locking pin 530, and a second wire 560 for connecting the release lever 520 and the locking hook 540.

The illustrated embodiment of the present invention has a configuration in which, when the locking mechanism 400 operates under the condition that both the rail mechanism 300 and the rotating mechanism 400 are in a locked state, unlocking of the rail mechanism 300 and unlocking of the rotating mechanism 400 are sequentially carried out in this order.

That is, when the handle lever 510 rotates up to a position where the handle lever 510 comes into contact with the release lever 520, in a state in which the handle lever 510 is spaced apart from the release lever 520 without contacting the release lever 520, only the first wire 550 is pulled toward the handle lever 510 and, as such, the locking pin 530 is first operated. In accordance with continued rotation of the handle lever 510, the release lever 520 comes into contact with the handle lever 510 and, as such, is moved. In accordance with movement of the release lever 520, the second wire 560 is pulled toward the release lever 520, thereby causing the locking hook 540 to operate.

In addition, the apparatus according to the illustrated embodiment of the present invention has a configuration in which the main box 100 is maintained at one of rotation positions respectively corresponding to different rotation angles during rotation thereof. For this configuration, plural arc-shaped grooves 331 are formed at one end of the rail bracket while being spaced apart from one another in a rotation direction about the hinge shaft 410. In addition, the hinge bracket 420 is provided with a ball 610 selectively insertable into one of the arc-shaped grooves 331 and a ball spring 620 for elastically supporting the ball 610.

Hereinafter, operation of the illustrated embodiment of the present invention will be described.

Figure 2:
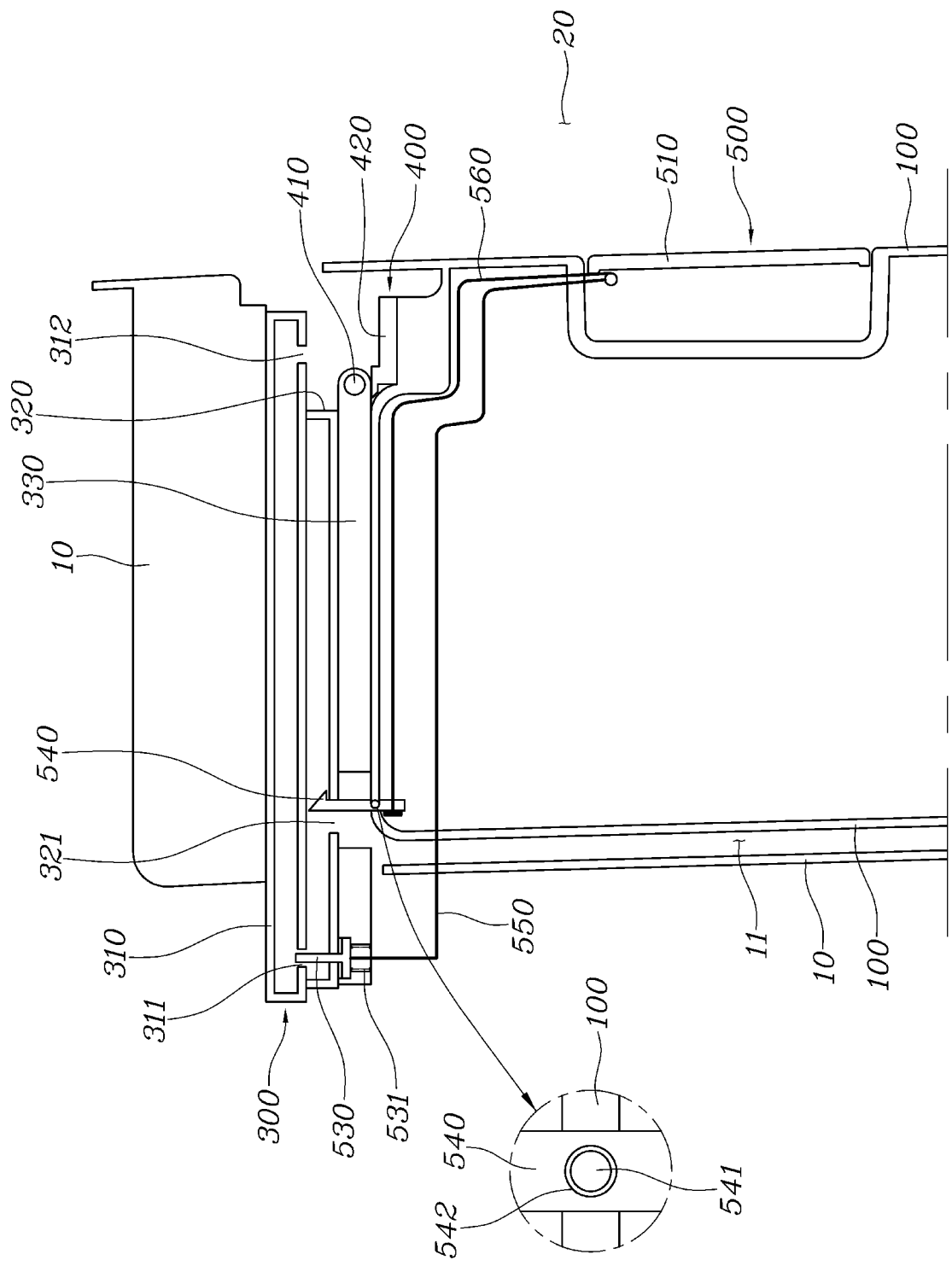
FIG. 2 is a sectional view corresponding to FIG. 1.
Figure 3:
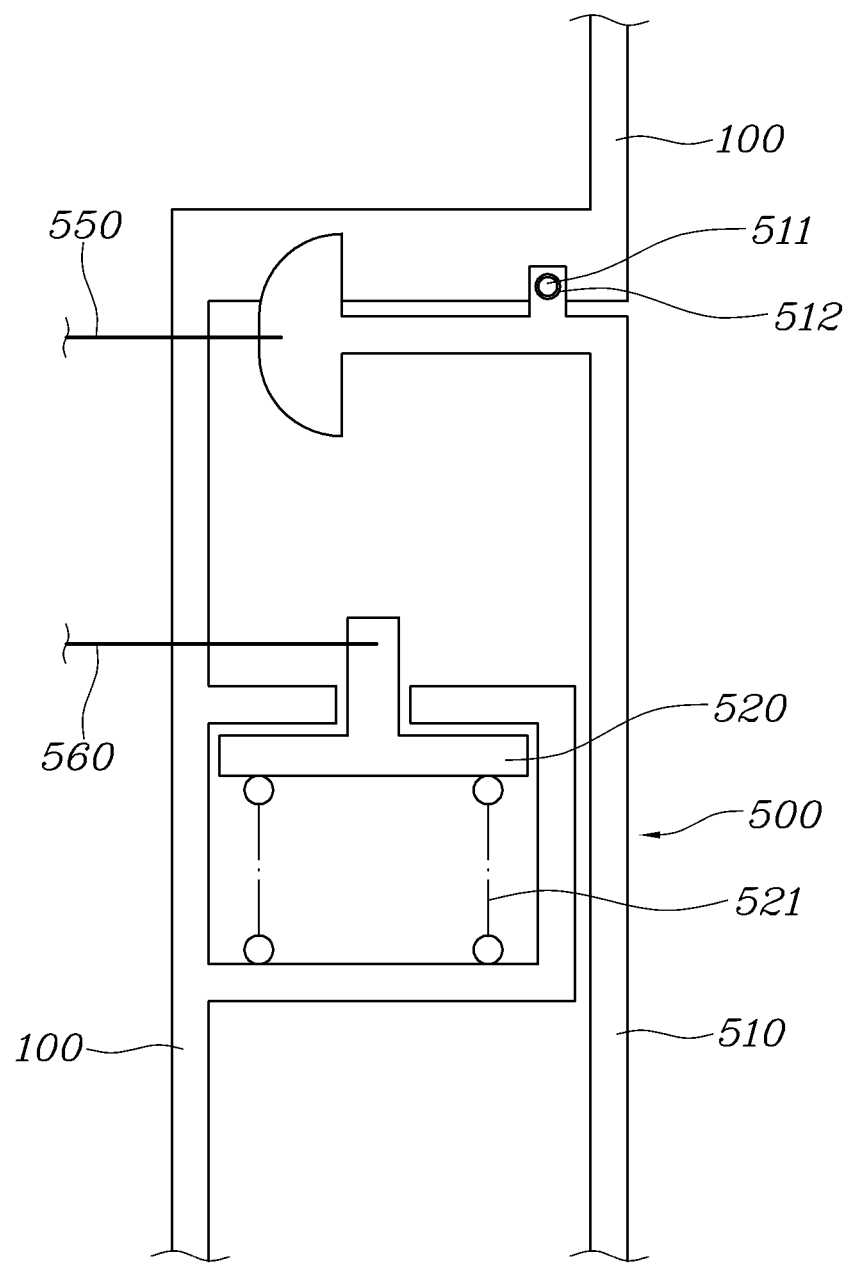
FIG. 3 is a view explaining a handle lever and a release lever in the state of FIG. 1.

FIGS. 1 to 3 illustrate a state in which the main box 100 is received in the main box receiving space 11.

In this state, the locking pin 530 is in a state of being inserted into the first locking hole 311 of the fixed rail 310 and, as such, the movable rail 320 is in a restrained state in which the movable rail 320 cannot move along the fixed rail 310. In addition, the locking hook 540 is maintained in a state of being inserted into the third locking hole 321 of the movable rail 320.

Figure 4:
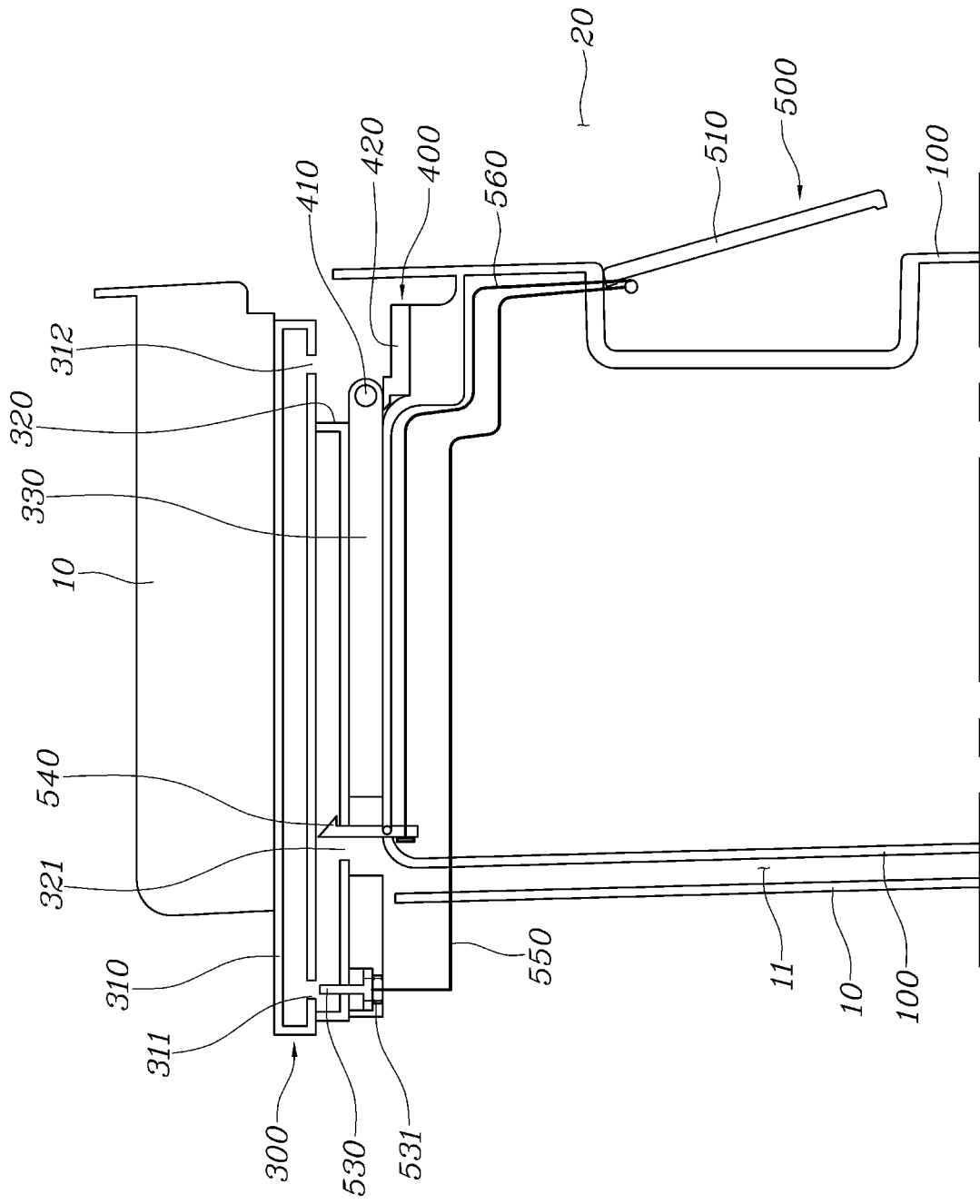
FIGS. 4 and 5 are views illustrating a state in which a locking pin is separated from a first locking hole in accordance with primary rotation of a handle lever.
Figure 5:
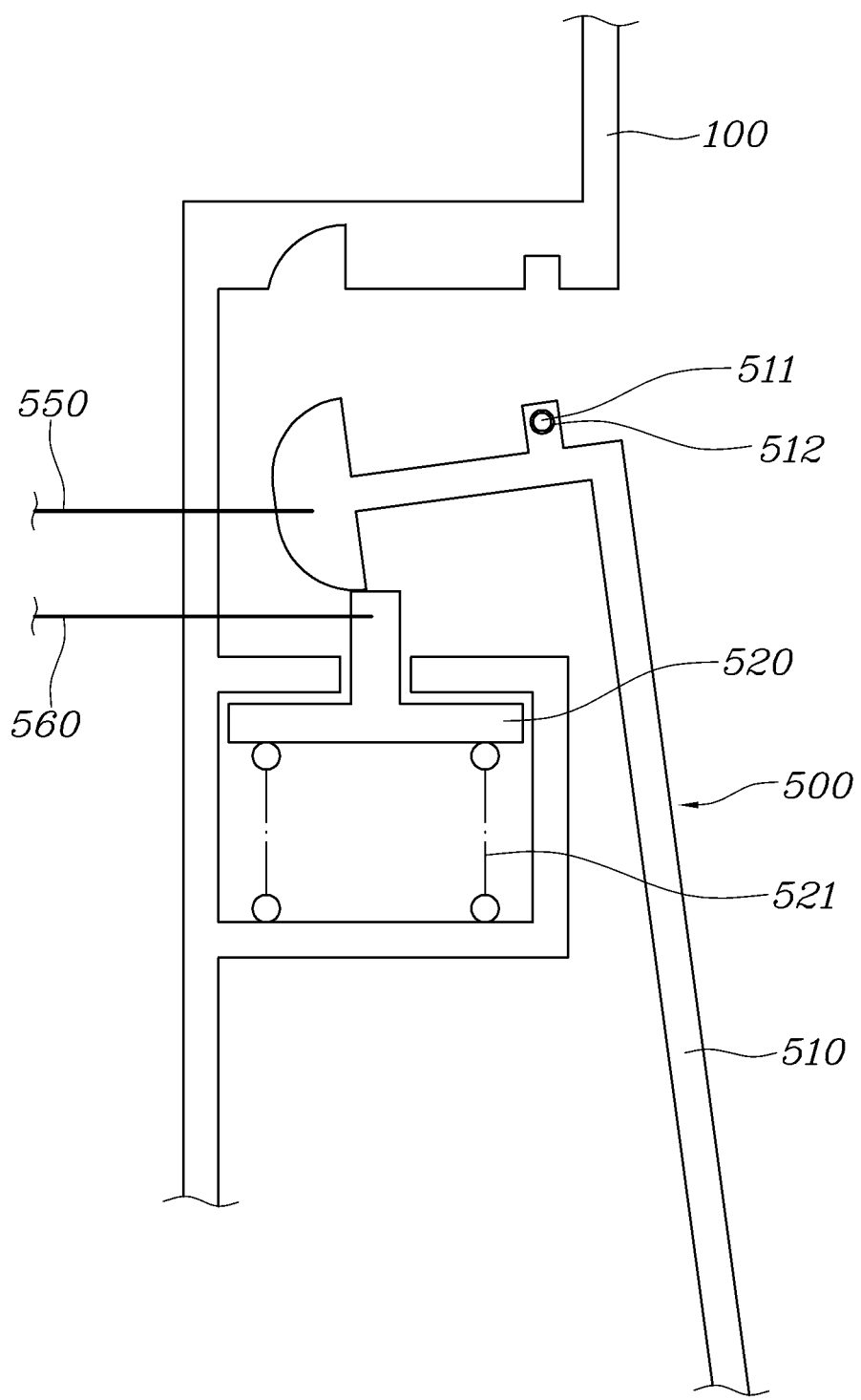

FIGS. 4 and 5 illustrate a state in which the user has primarily rotated the handle lever 510 up to a position where the handle lever 510 comes into contact with the release lever 520 while grasping the handle lever 510.

During the primary rotation of the handle lever 510, only the handle lever 510 rotates, and the release lever 520 does not operate. Accordingly, only the first wire 550 is pulled toward the handle lever 510, whereas the second wire 560 is not pulled toward the release lever 520. In accordance with pulling force of the first wire 550, the locking pin 530 is separated from the first locking hole 311. In this state, the movable rail 320 enters a state in which the movable rail 320 is movable along the fixed rail 310.

Figure 6:
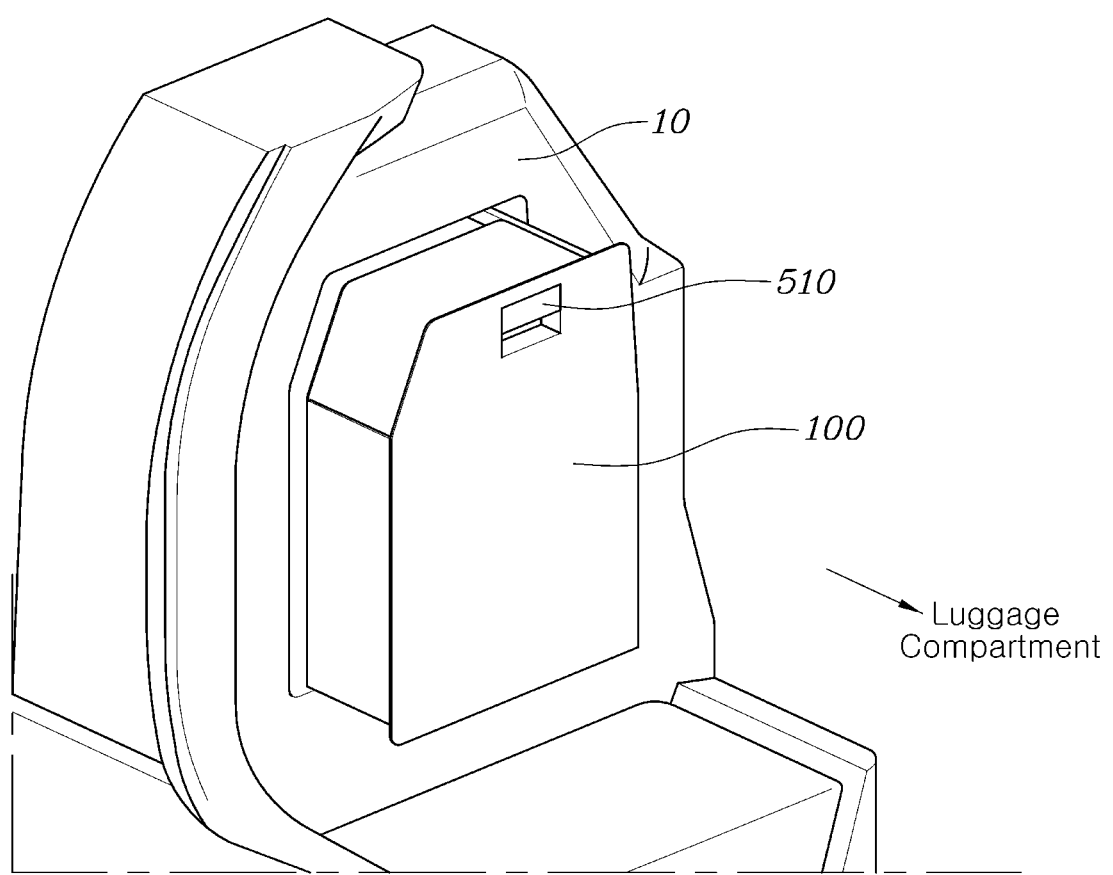
FIGS. 6 and 7 are views illustrating a state in which the main box slides toward a luggage compartment, to be exposed to the luggage compartment, that is, a pop-up state of the main box.
Figure 7:
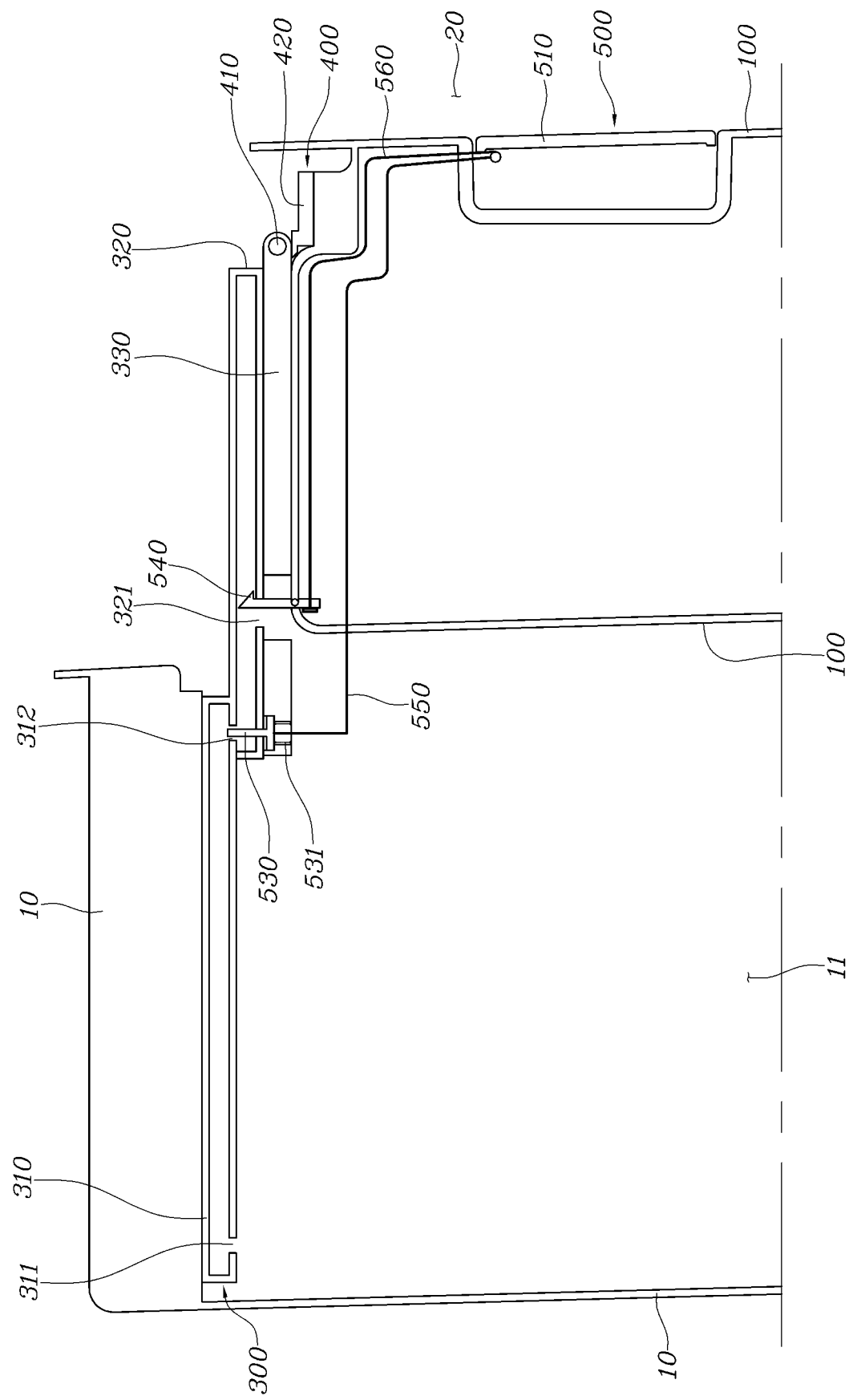
Figure 8:
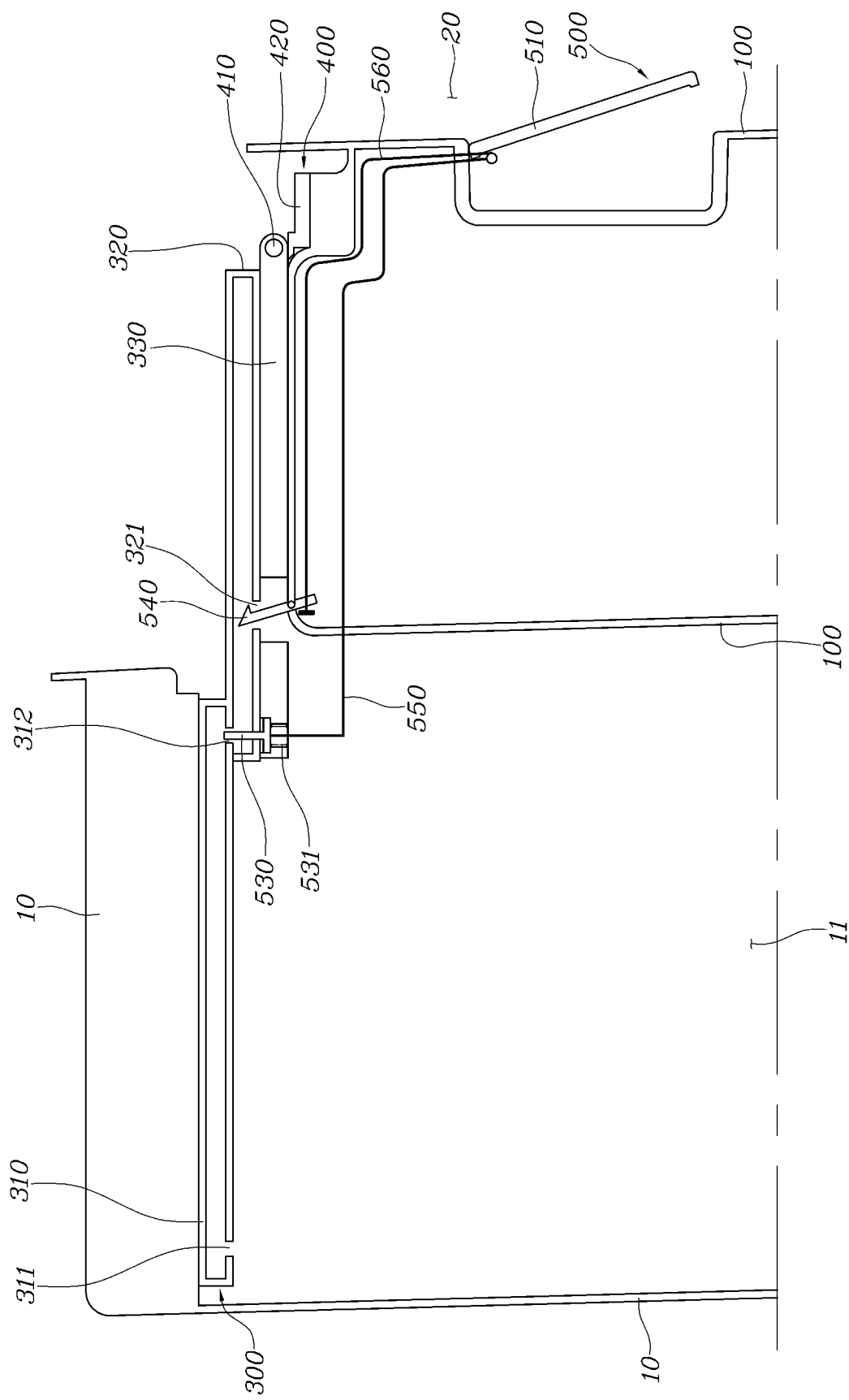
FIGS. 8 and 9 are views illustrating a state in which a locking hook is separated from a third locking hole in accordance with secondary rotation of the handle lever.
Figure 9:
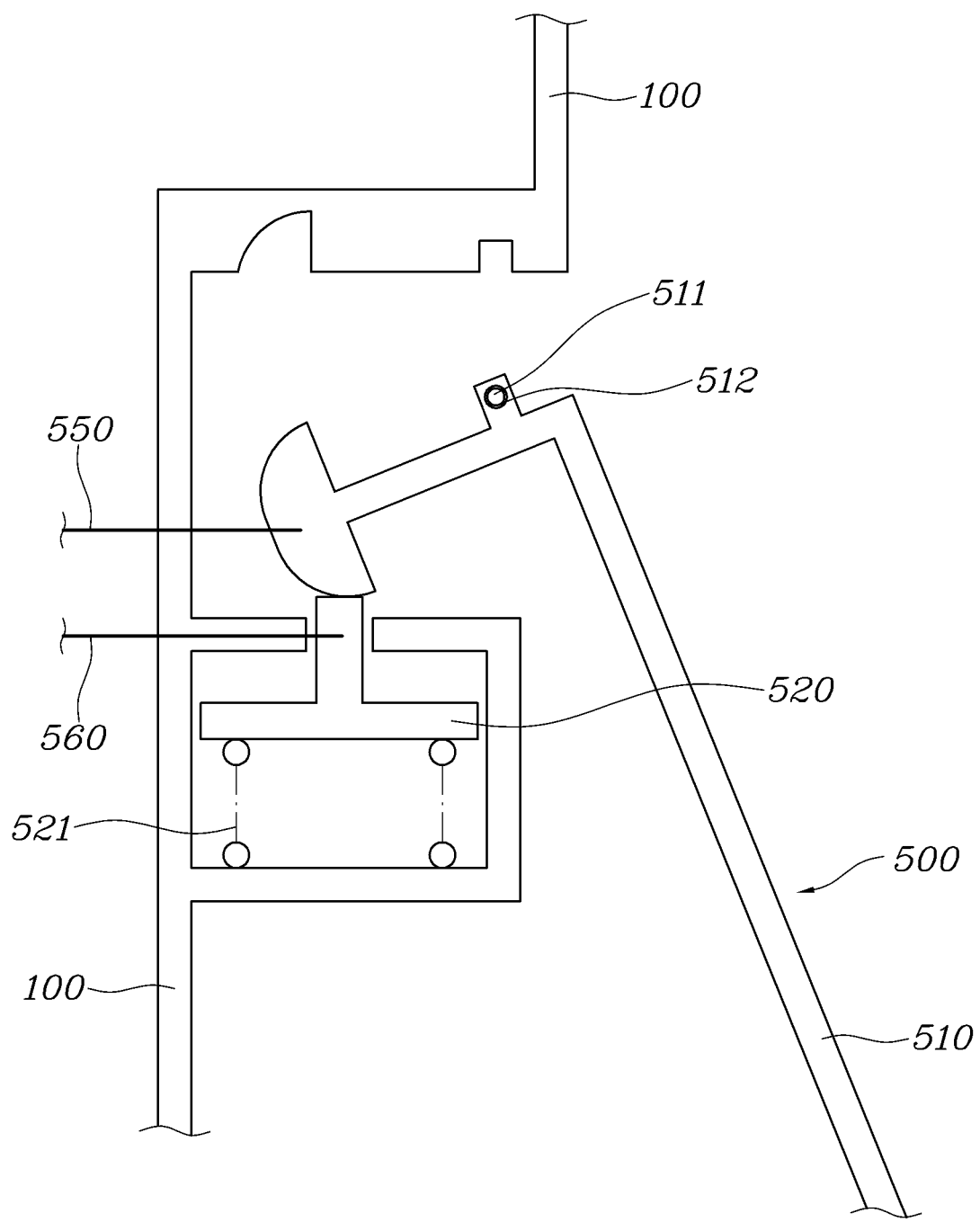

When the user pulls the main box 100 toward the luggage compartment 20 from the state of FIGS. 4 and 5 while grasping the handle lever 510, the movable rail 320 and the rail bracket 330 are moved along the fixed rail 310 toward the luggage compartment 20, as illustrated in FIGS. 6 and 7.

At the same time, the main box 100 coupled to the rail bracket 330 moves toward the luggage compartment 20 and, as such, enters a pop-up state in which the main box 100 is exposed to the luggage compartment 20.

When the movable rail 320 moves maximally toward the luggage compartment 20, the locking pin 530 is inserted into the second locking hole 312 of the fixed rail 310. As a result, the movable rail 320 again enters a restrained state in which the movable rail 320 cannot move along the fixed rail 310. In this state, the locking hook 540 is maintained in a state of being inserted into the third locking hole 321 of the movable rail 320.

When the user further rotates the handle lever 510 from the primary rotation state under the condition that the main box 100 is in the pop-up state, to be exposed to the luggage compartment 20, the release lever 520 is moved while being pressed by the handle lever 510. In accordance with the movement of the release lever 520, the second wire 560 is pulled toward the release lever 520. The locking hook 540 is rotated by pulling force of the second wire 560 and, as such, is separated from the third locking hole 321. In this state, the main box 100 enters a restraint released state in which the main box 100 is rotatable by the rotating mechanism 400.

Figure 10:
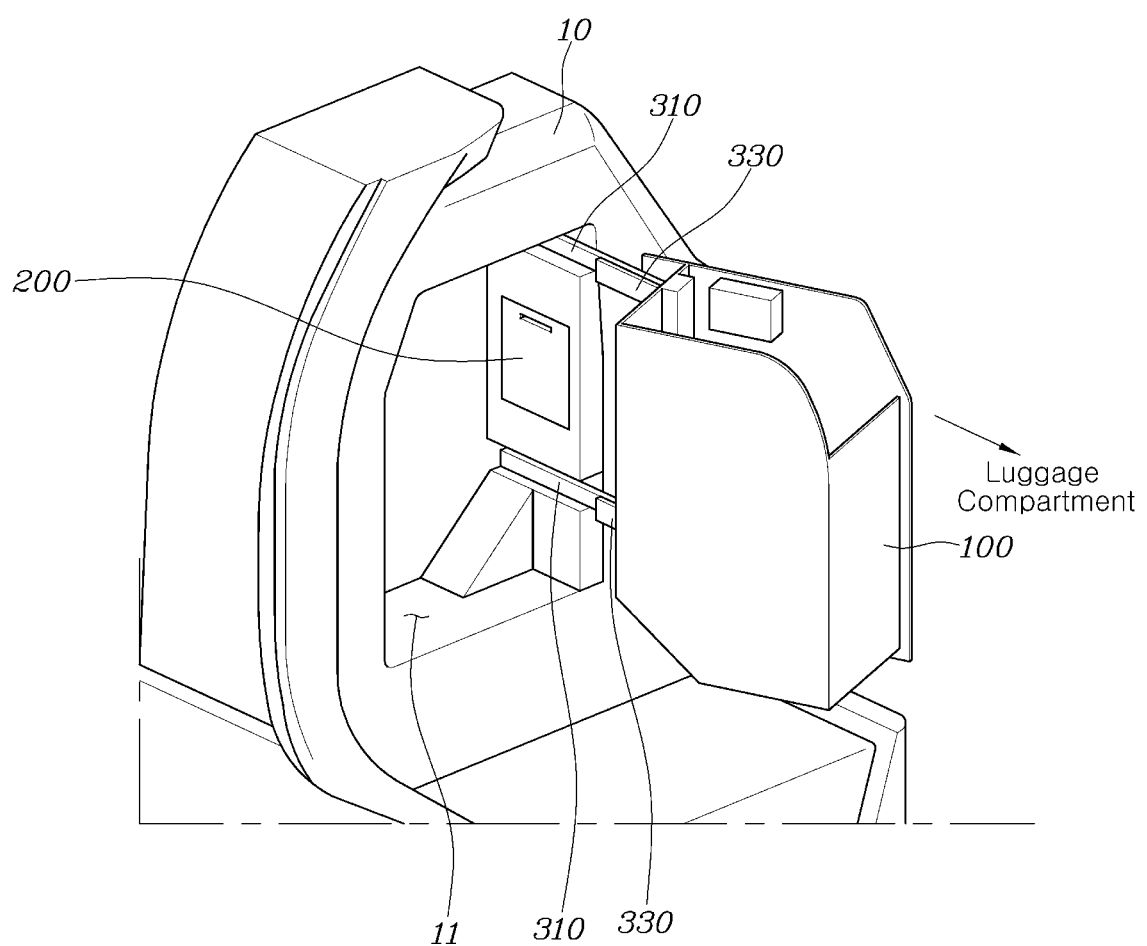
FIGS. 10 and 11 are views illustrating a state in which the exposed main box rotates toward the luggage compartment.
Figure 11:
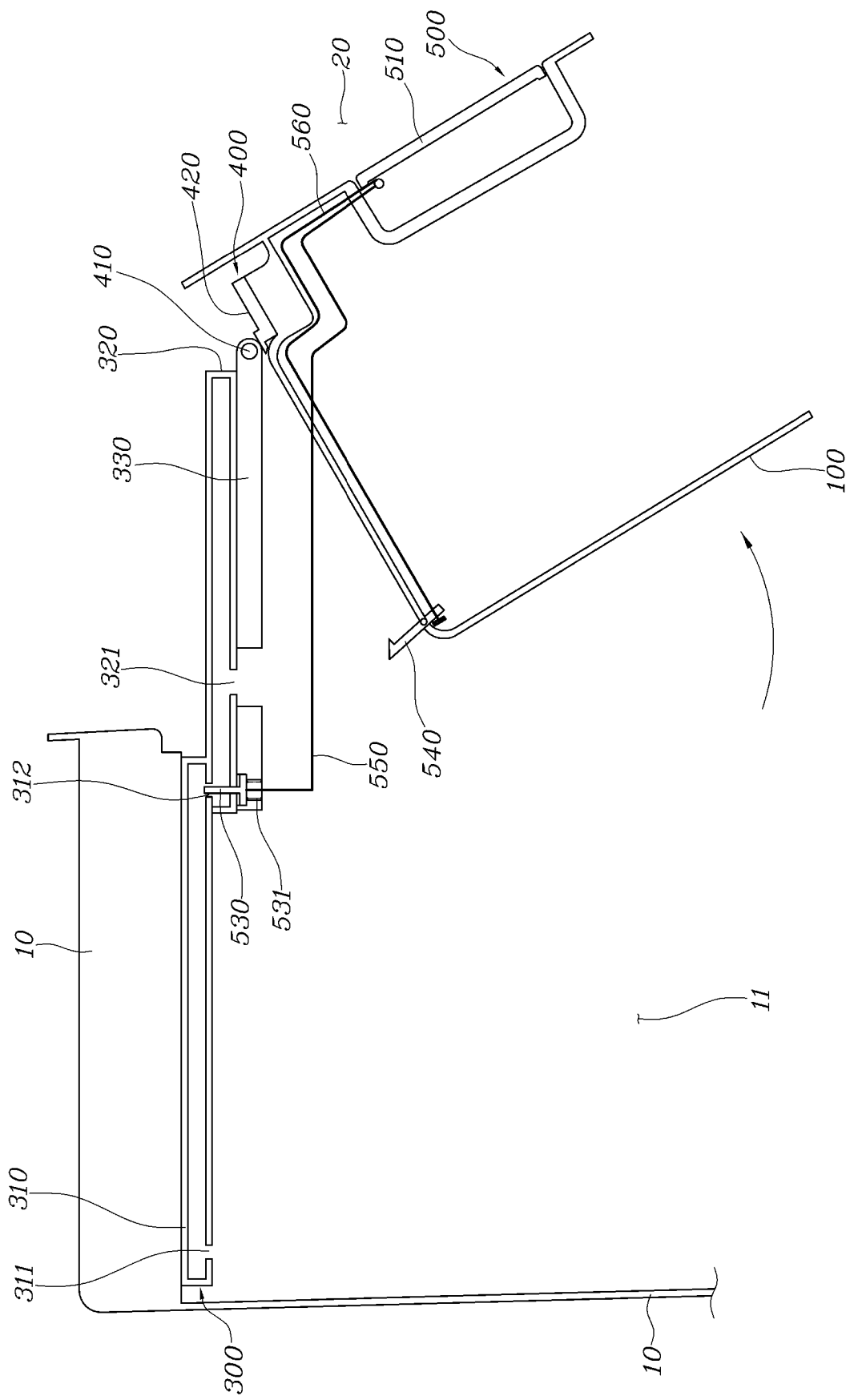
Figure 12:
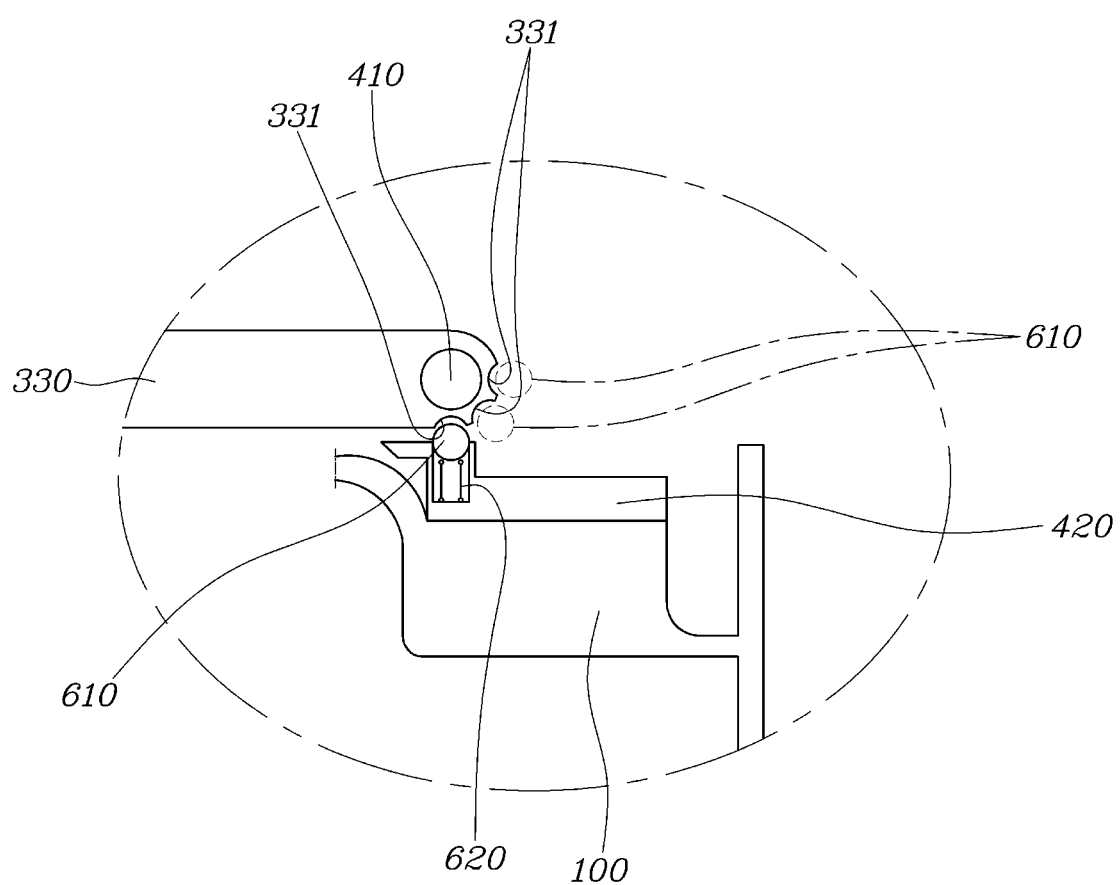
FIG. 12 is a view explaining a configuration capable of adjusting a rotation angle of the main box.
Figure 13:
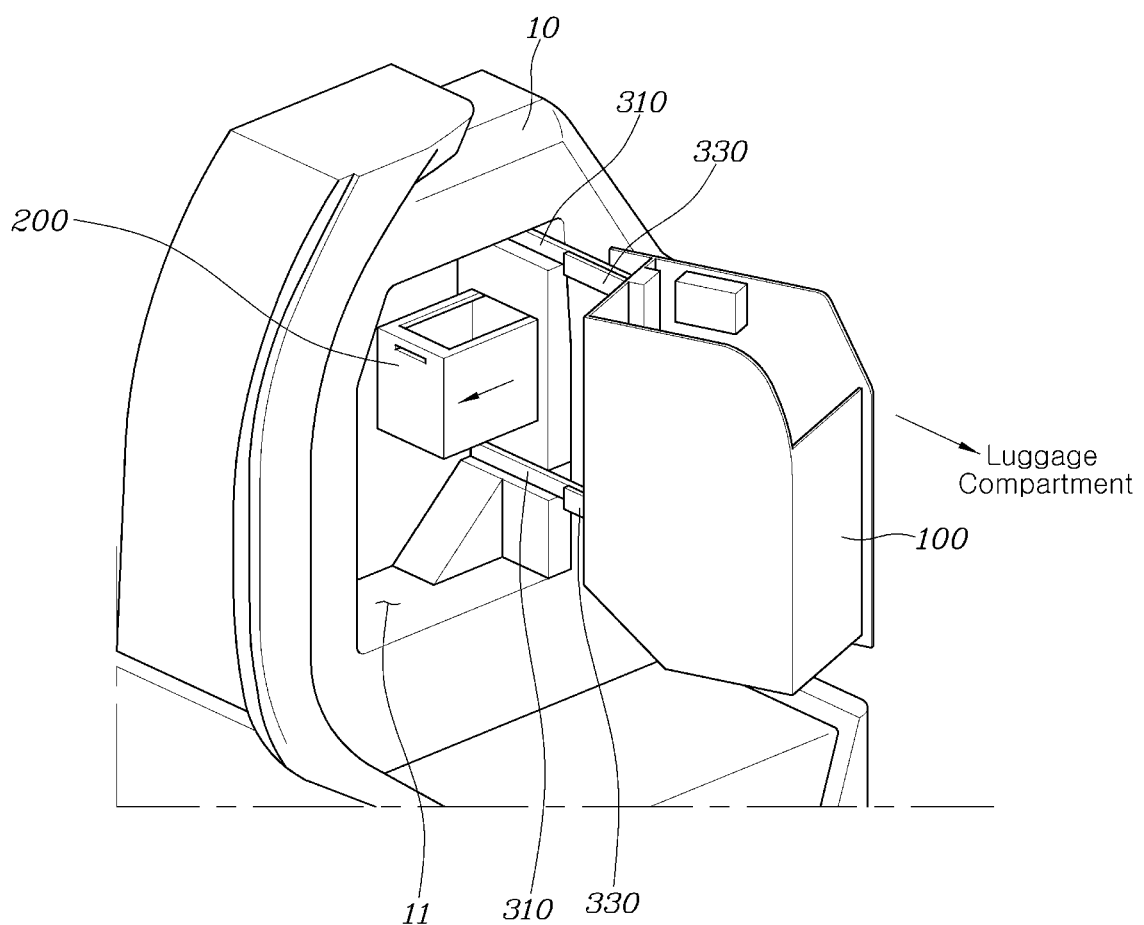
FIG. 13 is a view illustrating a state in which a hidden box is withdrawn toward a main box receiving space.

FIGS. 10 and 11 illustrate a state in which withdrawal of the main box 100 toward the luggage compartment 20 is completed in accordance with rotation of the main box 100 about the hinge shaft 410. In this state, the user may stow articles in the completely withdrawn main box 100, to store the articles in the main box 100.

After the main box 100 received in the main box receiving space 11 is completely withdrawn toward the luggage compartment 20 in accordance with linear sliding movement and rotation thereof, the main box receiving space 11 becomes empty. In this state, the user may withdraw the hidden box 200 hidden by the side wall of the main box receiving space 11 toward the main box receiving space 11, in order to use the hidden box 200.

Retraction operation of the main box 100 and the hidden box 200 is carried out in reverse order to that of the above-described operation and, as such, no description thereof will be given.

As apparent from the above description, the illustrated embodiment of the present invention has a configuration capable of receiving and storing articles using the main box 100 and the hidden box 200 and, as such, it may be possible to increase the number of articles to be stored. Accordingly, there may be an advantage in that an enhancement in storage functionality is achieved.

In addition, since the main box 100 and the hidden box 200 may be received and stored in the interior of the luggage side trim 10 through utilization of the unused space, there may be an advantage in that space utility is greatly enhanced.

Furthermore, the illustrated embodiment of the present invention provides a configuration capable of preventing separation of articles stored in the main box 100 and the hidden box 200 without using a net, differently from conventional cases. Accordingly, there may be an advantage in that cost saving is achieved by virtue of no use of a net.

In addition, in accordance with the present invention, when the main box 100 and the hidden box 200 are in a state of being received in the luggage side trim 10, only an outline of the main box 100 is visible from the outside of the luggage side trim 10. Accordingly, there may be an advantage in that exposure of the main box 100 and the hidden box 200 in the received state is minimized and, as such, an enhancement in aesthetics may be achieved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A luggage box apparatus for a vehicle, the luggage box apparatus comprising:
    a main box received in a main box receiving space provided at a luggage side trim, the main box being withdrawable from the main box receiving space toward a luggage compartment, for use thereof, wherein the main box is installed to perform linear sliding movement in a withdrawal direction and rotation with respect to the luggage side trim;
    a rail mechanism installed to connect the main box and the luggage side trim, the rail mechanism configured to guide the linear sliding movement of the main box;
    a rotating mechanism installed to connect the rail mechanism and the main box, the rotating mechanism enabling the rotation of the main box; and
    a locking mechanism operating to lock or unlock the rail mechanism and the rotating mechanism, wherein, when the locking mechanism operates under a condition that both the rail mechanism and the rotating mechanism are in a locked state, unlocking of the rail mechanism and unlocking of the rotating mechanism can be sequentially carried out in this order.

2. The luggage box apparatus according to claim 1, further comprising a hidden box installed at a side wall defining the main box receiving space, the hidden box being withdrawable from the side wall toward the main box receiving space after withdrawal of the main box, for use thereof.

3. The luggage box apparatus according to claim 1, wherein the rail mechanism comprises:
    a fixed rail fixedly coupled to the luggage side trim;
    a movable rail coupled to the fixed rail such that the movable rail is movable along the fixed rail; and
    a rail bracket coupled to the movable rail and the main box, to connect the movable rail and the main box.

4. The luggage box apparatus according to claim 3, further comprising a hidden box installed at a side wall defining the main box receiving space, the hidden box being withdrawable from the side wall toward the main box receiving space after withdrawal of the main box, for use thereof.

5. The luggage box apparatus according to claim 3, wherein a first locking hole and a second locking hole are formed at opposite ends of the fixed rail, respectively, to be open in a downward direction, and a third locking hole is formed at the movable rail, to be open in the downward direction.

6. The luggage box apparatus according to claim 5, further comprising a hidden box installed at a side wall defining the main box receiving space, the hidden box being withdrawable from the side wall toward the main box receiving space after withdrawal of the main box, for use thereof.

7. The luggage box apparatus according to claim 5, wherein the rotating mechanism comprises:
    a hinge shaft rotatably coupled to one end of the rail bracket facing the luggage compartment; and
    a hinge bracket for connecting the hinge shaft and the main box.

8. The luggage box apparatus according to claim 7, wherein:
plural arc-shaped grooves are formed at one end of the rail bracket while being spaced apart from one another in a rotation direction about the hinge shaft; and
the hinge bracket is provided with a ball selectively insertable into one of the arc-shaped grooves and a ball spring for elastically supporting the ball.

9. The luggage box apparatus according to claim 7, further comprising a hidden box installed at a side wall defining the main box receiving space, the hidden box being withdrawable from the side wall toward the main box receiving space after withdrawal of the main box, for use thereof.

10. The luggage box apparatus according to claim 5, wherein the locking mechanism comprises:
a handle lever elastically rotatably mounted to the main box by means of a first shaft and a first spring;
a release lever elastically movably mounted to the main box by means of a second spring while being spaced apart from the handle lever such that the release lever comes into contact with the handle lever during rotation of the handle lever, thereby enabling the release lever to operate;
a locking pin elastically movably mounted to the rail bracket by means of a third spring while having one end extendable through the movable rail, to operate such that the end is inserted into or separated from the first locking hole of the fixed rail or the second locking hole of the fixed rail;
a locking hook elastically rotatably mounted to the main box by means of a second shaft and a fourth spring such that the locking hook operates to be inserted into or separated from the third locking hole of the movable rail;
a first wire for connecting the handle lever and the locking pin; and
a second wire for connecting the release lever and the locking hook.

11. The luggage box apparatus according to claim 10, wherein:
when the handle lever rotates up to a position where the handle lever comes into contact with the release lever, in a state in which the handle lever is spaced apart from the release lever without contacting the release lever, only the first wire is pulled toward the handle lever, thereby causing the locking pin to operate first; and
when the release lever comes into contact with the handle lever in accordance with continued rotation of the handle lever, thereby causing the release lever to move, the second wire is pulled toward the release lever, thereby causing the locking hook to operate.

12. The luggage box apparatus according to claim 10, further comprising a hidden box installed at a side wall defining the main box receiving space, the hidden box being withdrawable from the side wall toward the main box receiving space after withdrawal of the main box, for use thereof.

13. A method of operating a luggage box apparatus in a main box receiving space provided at a luggage side trim of a vehicle, the luggage box apparatus comprising a rail mechanism connecting the main box and the luggage side trim, a rail locking mechanism, and a rotating mechanism installed to connecting the rail mechanism and the main box, the rotating mechanism enabling rotation of the main box, the method comprising:
withdrawing the main box from the main box receiving space toward a luggage compartment of the vehicle by guiding a linear sliding movement of the main box using the rail mechanism and rotating the main box using the rotating mechanism; and
replacing the main box in the main box receiving space, wherein the withdrawing and replacing comprise performing the linear sliding movement of the main box in a withdrawal direction and rotation with respect to the luggage side trim; and
locking both the rail locking mechanism and the rotating mechanism.

14. The method according to claim 13, wherein the luggage box apparatus further comprises a hidden box installed at a side wall defining the main box receiving space, the method further comprising withdrawing the hidden box from the side wall toward the main box receiving space after withdrawing the main box.

15. The method according to claim 13, further comprising unlocking the rail mechanism and then unlocking the rotating mechanism.

16. The method according to claim 15, wherein the luggage box apparatus further comprises a hidden box installed at a side wall defining the main box receiving space, the method further comprising withdrawing the hidden box from the side wall toward the main box receiving space after withdrawing the main box.

17. The method according to claim 13, wherein the the rail locking mechanism comprises:
a handle lever elastically rotatably mounted to the main box by a first shaft and a first spring;
a release lever elastically movably mounted to the main box by a second spring while being spaced apart from the handle lever when the main box is engaged in the main box receiving space;
a locking pin elastically movably mounted to a rail bracket of the rail mechanism by a third spring while having one end extendable through a movable rail of the rail mechanism;
a locking hook elastically rotatably mounted to the main box by a second shaft and a fourth spring such that the locking hook operates to be inserted into or separated from a locking hole of the movable rail;
a first wire connecting the handle lever and the locking pin; and
a second wire connecting the release lever and the locking hook.

18. The method according to claim 17, wherein the locking comprises:
rotating the handle lever to a position where the handle lever comes into contact with the release lever so that only the first wire is pulled toward the handle lever, thereby causing the locking pin to operate first; and
when the release lever comes into contact with the handle lever in accordance with continued rotation of the handle lever, moving the release lever so that the second wire is pulled toward the release lever, thereby causing the locking hook to operate.

19. The method according to claim 18, wherein the luggage box apparatus further comprises a hidden box installed at a side wall defining the main box receiving space, the method further comprising withdrawing the hidden box from the side wall toward the main box receiving space after withdrawing the main box.

20. The method according to claim 17, wherein the luggage box apparatus further comprises a hidden box installed at a side wall defining the main box receiving space, the method further comprising withdrawing the hidden box from the side wall toward the main box receiving space after withdrawing the main box.

* * * * *